(12) United States Patent
Lauer

(10) Patent No.: US 10,691,513 B1
(45) Date of Patent: Jun. 23, 2020

(54) DISTRIBUTED MESSAGE QUEUE WITH BEST CONSUMER DISCOVERY AND AREA PREFERENCE

(75) Inventor: Joseph Jeremy Lauer, Seattle, WA (US)

(73) Assignee: TWITTER, INC., San Francisco, CA (US)

( * ) Notice: Subject to any disclaimer, the term of this patent is extended or adjusted under 35 U.S.C. 154(b) by 43 days.

(21) Appl. No.: 13/019,998

(22) Filed: Feb. 2, 2011

Related U.S. Application Data

(60) Provisional application No. 61/301,187, filed on Feb. 3, 2010.

(51) Int. Cl.
*G06F 9/54* (2006.01)
(52) U.S. Cl.
CPC .................................. *G06F 9/546* (2013.01)
(58) Field of Classification Search
CPC ........................................................ G06F 9/546
USPC ............................................................ 709/224
See application file for complete search history.

(56) References Cited

U.S. PATENT DOCUMENTS

| | | | |
|---|---|---|---|
| 7,730,186 B2 * | 6/2010 | Lai | 709/226 |
| 2005/0125557 A1 * | 6/2005 | Vasudevan | G06F 11/2041 709/239 |
| 2008/0034051 A1 * | 2/2008 | Wallis et al. | 709/207 |
| 2008/0040396 A1 * | 2/2008 | Wallis | G06F 9/546 |

OTHER PUBLICATIONS

"Apache Active MQ," Dec. 23, 2007.*

* cited by examiner

*Primary Examiner* — Andrew C Georgandellis
(74) *Attorney, Agent, or Firm* — Nixon & Vanderhye, P.C.

(57) ABSTRACT

A distributed message queue is disclosed which facilitates queue consumer discovery across multiple areas while providing for area preference.

6 Claims, 5 Drawing Sheets

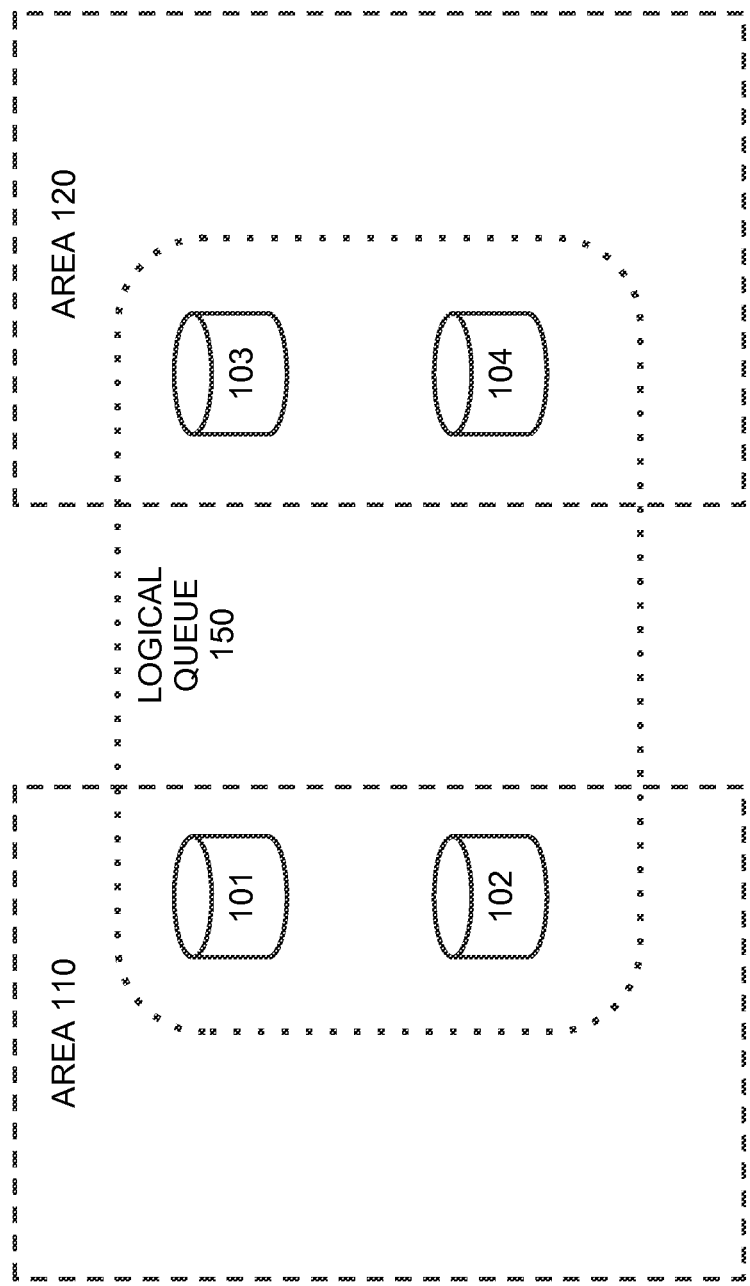

US 10,691,513 B1

DISTRIBUTED MESSAGE QUEUE WITH BEST CONSUMER DISCOVERY AND AREA PREFERENCE

BACKGROUND OF THE INVENTION

The present invention relates to distributed message queues, in particular, as used across multiple data centers.

The Internet is generally reliable, but outages and latency are systematic issues. One approach to providing redundancy is to replicate systems at geographically-dispersed data centers. If an outage occurs at one data center, customers and vendors can still access services at a second data center. This approach, however, can result in the underutilization of the hardware and software at some data centers while other data centers handle the majority of the traffic, in particular where the data centers are handling a substantial amount of traffic, such as aggregators for mobile messaging traffic.

SUMMARY OF THE INVENTION

A distributed message queue is disclosed which facilitates queue consumer discovery across multiple areas while providing for area preference. A logical message queue is provided from a queue that may be distributed across several different systems or even several different geographically-dispersed data centers. Each system automatically discovers other systems that have consumers for a particular queue. A system will automatically distribute its messages to other systems that have active consumers, preferring systems in accordance with an area preference. If no systems with a consumer are present within the area preference, systems will failover to systems in a different area. In accordance with an embodiment of the invention, the area preference is expressed based on the area in which the consumer is located. The area preference can be expressed, for example, as follows: local, within same area, or any area. If a local consumer is present for a queue within a system producing items to that same queue, the queue item is not transferred to a remote system. If no local consumer is present, then a consumer present on a system within the same area can be preferred. If no local consumer or consumer within the same area is present, then a consumer in any other area can be preferred. If multiple consumers are present within the same area, then items can be consumed using a weighted, load-balanced approach.

By having systems distribute items across the logical queue in accordance with the area preference, bandwidth usage can be reduced for inter-area communications. The disclosed approach is particularly advantageous when aggregating mobile messaging requests to multiple mobile communication networks across multiple data centers.

Details of one or more embodiments are set forth in the accompanying drawings and description below.

DESCRIPTION OF DRAWINGS

FIGS. 1, 3 and 4 are conceptual representations of a plurality of hosts configured to illustrate embodiments of the invention.

Like referenced symbols in the various drawings indicate like elements.

DETAILED DESCRIPTION

Figure 2A:
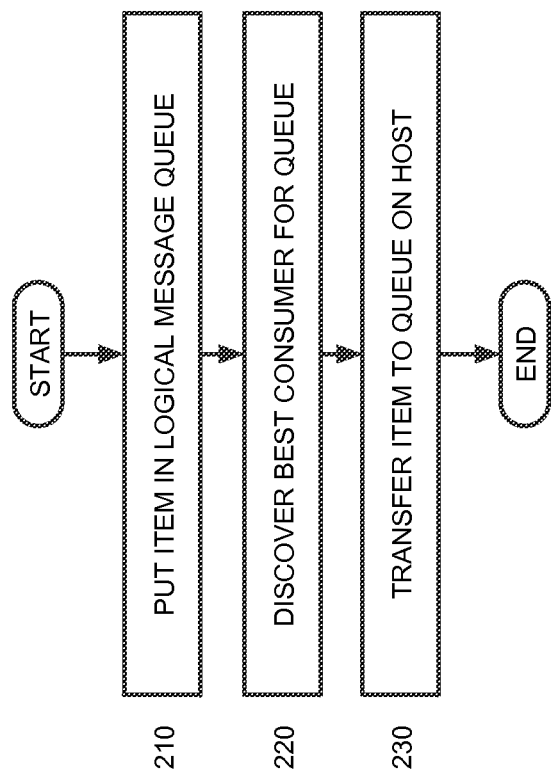
FIGS. 2A and 2B are a flowcharts of processing performed in accordance with an embodiment of the invention.

FIG. 1 is a conceptual representation of a plurality of hosts configured to illustrate an embodiment of the invention. A plurality of hosts 101, 102, 103, 104 are depicted. The hosts can represent different machines or virtual machines. For example, each host can represent a computing device, such as a digital computer comprising a processor, memory, and one or more communication interfaces. Alternatively, each host can be a process or processes executing on one or more computing devices. The hosts are connected by a communication network comprised of some physical communication medium and a communication protocol for controlling communication over the medium. Some of the hosts 101, 102 are geographically located in a proximate area 110, while other hosts 103, 104 are located in area 120. For example, hosts 101, 102 could be located at a data center 110 which is geographically distant from another data center 120 where hosts 103, 104 are located.

In accordance with an embodiment of the invention, a logical message queue 150 is provided that is distributed across the different hosts 101, 102, 103, 104. The logical message queue 150 can be implemented using known distributed queuing techniques. Processes on a host can be a producer or a consumer of items in the logical queue 150. Each item in the logical queue can represent a task to be performed by the host or another host in the area. For example, each item in the queue can represent a message, such as an SMS or other text message, to be forwarded by the system to a communication network, such as a mobile telecommunications network.

For illustration purposes, the hosts 101, 102, 103, 104 are configured as follows. In area 110, Host 101 has been configured to produce items to queue 150.

Host 101 is also configured to discover consumers on other hosts 102, 103, 104.

Host 102 has been configured to consume items from queue 150.

Host 102 has also been configured to discover consumers on other hosts 101, 103, 104.

In area 120,

Host 103 has been configured to produce items to queue 150.

Host 103 has also been configured to discover consumers on other hosts 101, 102, 104.

Host 104 has been configured to consume items from queue 150.

Host 104 has also been configured to discover consumers on other hosts 101, 102, 103.

Figure 2B:
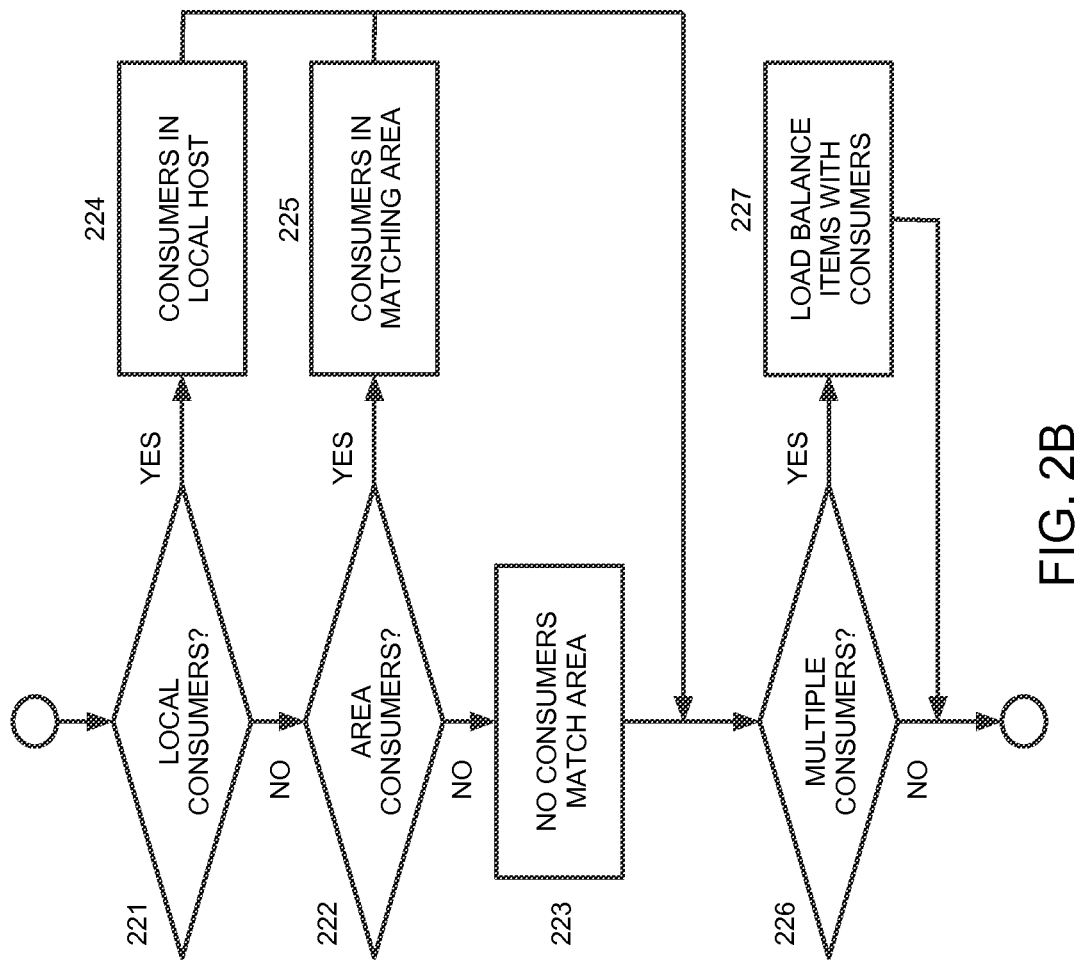

FIGS. 2A and 2B are flowcharts of processing performed in accordance with an embodiment of the invention.

In FIG. 2A, at step 210, a host, when configured as a producer, puts an item in the logical message queue. The item, for example, can be a task to send a message, such as an SMS message, to a mobile subscriber in a mobile communication network. At step 220, the host discovers an optimal consumer for the queued item. The best consumer for an item produced on the queue is decided based on the area in which a consumer is located, an embodiment of which is further set forth in FIG. 2B. Then, at step 230, the host proceeds to transfer the item to the queue on the host consumer identified in step 220.

FIG. 2B further illustrates a preferred embodiment of the discovery process in FIG. 2A. At step 221 in FIG. 2B, the host determines whether there are any local consumers on the same host. If a local consumer is present for a queue within the host producing items to that same queue, the item is preferably not transferred to a remote host. Instead, at step 224, processing proceeds with the consumers identified as being on the local host. If no local consumer is present, then, a consumer present on a host within the same area is preferred. At step 222, a determination is made whether there are any consumers present on a host within the same area. If consumers are found in the matching area, then, at step 225, processing proceeds with the consumers identified as being in the matching area. If no local consumer or consumer within the same area is present, at step 223, then a consumer in any other area is preferred. If at step 226 multiple consumers are present within the same area, then, at step 227, items can be consumed using a weighted, load-balanced approach.

For example, and with reference to FIG. 1, consider host 101 which is a producer to queue 150. If host 101 puts an item on queue 150, it is configured to discover that the best consumer for queue 150 is on host 102, since the area assigned to each host matches. Host 101 would transfer the item to queue 150 on host 102. Similarly, if host 103 puts another item on queue 150, it will discover that the best consumer for queue 150 is on host 104, since the areas match. Host 103 would transfer the item to queue 150 on host 104.

Figure 3:
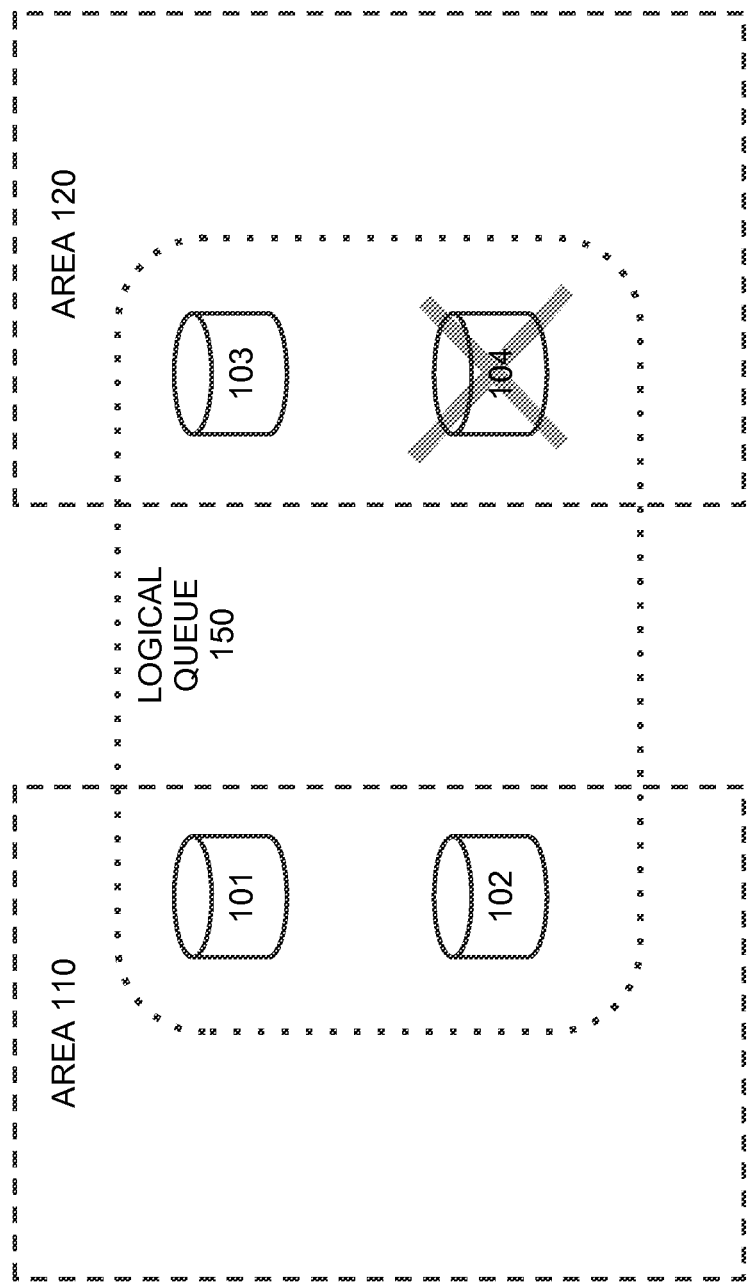

Consider the situation when one of the hosts in FIG. 1 fails or is taken offline. FIG. 3 depicts the hosts 101, 102, 103, 104 from FIG. 1, configured again as described above. The difference is that host 104, is now offline for some reason, e.g., because it has crashed or has been taken offline for maintenance. If host 101 puts an item on queue 150, as discussed above, it will discover that the best consumer for queue 150 is on host 102, since the areas match. Host 101 would transfer the item to queue 150 on host 102. Suppose, however, if host 103 puts an item in queue 150. In FIG. 3, host 103 will discover that the best consumer for queue 150 is on host 102, since host 104 is not longer consuming. Host 103, accordingly, ignores the area preference. Host 103 then transfers the item to queue 150 on host 102.

Figure 4:
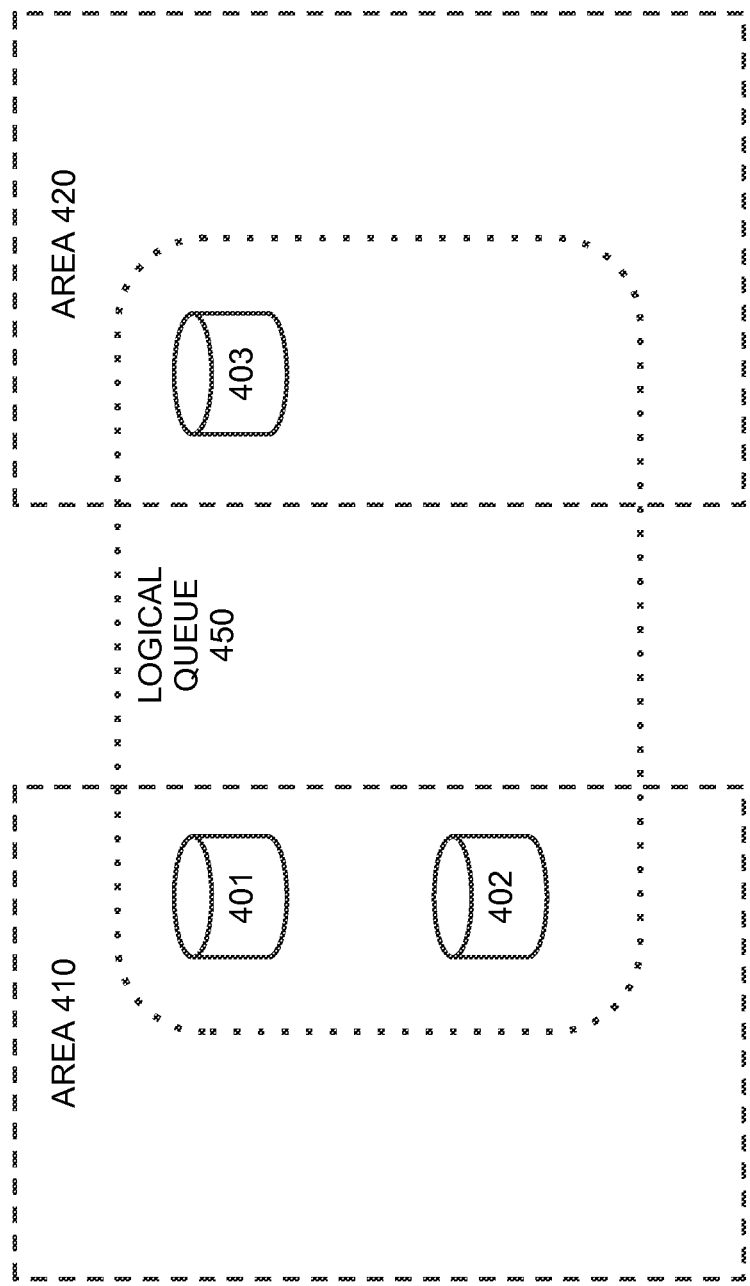

FIG. 4 is another conceptual representation of a plurality of hosts configured to illustrate an embodiment of the invention. A plurality of hosts 401, 402, 403 are depicted. Some of the hosts 401, 402 are geographically located in a proximate area 410, e.g., a first data center, while other hosts 403 are located in area 420, e.g., a second data center. In accordance with an embodiment of the invention, a logical message queue 450 is provided that is distributed across the different hosts 401, 402, 403.

For illustration purposes, the hosts 401, 402, 403 are configured as follows.

In area 410,
Host 401 has been configured to produce and consume items to/from queue 450.
Host 401 is also configured to discover consumers on other hosts 402, 403.
Host 402 has been configured to consume items from queue 450.
Host 402 has also been configured to discover consumers on other hosts 401, 403.
In area 420,
Host 403 has been configured to produce items to queue 450.
Host 403 has also been configured to discover consumers on other hosts 401, 402.

In FIG. 4, suppose host 401 puts an item on queue 450. Host 401 is configured to discovery that the best consumer for queue 450 is itself, since local consumers are preferred over area consumers. Host 401 will consume the item from queue 450. Consider if host 403 puts two items on queue 450. Host 403 will discover that the best consumer for queue 450 is either host 401 or host 402, since there are no local consumers or consumers matching the area of host 403. Host 403 will proceed to load-balance across host 401 and host 403, e.g., by transferring one of the items to queue 450 on host 401 and transferring the other item to queue 450 on host 402.

It is particularly advantageous to minimize the latency and bandwidth utilization associated with consuming items across a wide area network, such as the Internet. The advantages are magnified when the areas, e.g. data centers, are geographically dispersed. As messages grow in total byte size (e.g., multimedia picture messages), the overall bandwidth savings between data centers, decreased latency, and increased efficiency can be substantial. The disclosed approach causes hosts to automatically discovery optimal consumers for a particular queue while automatically distributing items to other hosts that have active consumers. By having hosts automatically prefer local consumers or consumer within its own area, bandwidth usage can be minimized between areas.

As discussed above, each host can be implemented using one or more computing devices such as a digital computer. The processor can execute instructions within the computing device, and the memory stores information within the computing device. In one implementation, the memory is a volatile memory unit or units. In another implementation, the memory is a non-volatile memory unit or units. The memory may also be another form of computer-readable medium, such as a magnetic or optical disk. The processing to be performed by a host can be tangibly embodied in a computer program product which may contain instructions that, when executed, perform the processing. The computer program product can be tangibly embodied in the memory, the processor memory, a propagated signal, or in some other form of storage. The computer program product can be implemented in a high-level programming language and/or in machine language instructions.

Multiple embodiments have been described, and it will be understood that various modifications can be made without departing from the spirit and scope of the invention. For example, different forms of area preferences and different types of items in the logical queue can be implemented. Accordingly, other embodiments are within the scope of the following claims.

I claim:

1. A computer-implemented method of queuing items in a logical queue distributed across multiple hosts operating in multiple data centers, the method comprising:
producing, by a producer process executing on a host operating in a first data center, a task for forwarding a message in a mobile communication network;
determining whether there is a consumer process executing on the host operating in the first data center;
storing the task in the portion of the logical queue that is distributed to the host operating in the first data center when it is determined that there is a consumer process executing on the host operating in the first data center;
determining whether there is a consumer process executing on another host operating in the first data center when it is determined that there is no consumer process executing on the host operating in the first data center;
sending the task to another host operating in the first data center and storing the task in the portion of the logical queue that is distributed to the other host when it is determined that there is a consumer process executing on the other host;
determining whether there is a consumer process executing on a host operating in a second data center when it is determined that there is no consumer process executing on another host operating in the first data center;

sending the task to a host operating in the second data center and storing the task in the portion of the logical queue that is distributed to the host operating in the second data center when it is determined that there is a consumer process executing on the host operating in the second data center.

2. The method of claim 1, wherein determining whether there is a consumer process executing on another host operating in the first data center further comprises determining that there is a first consumer process executing on a first other host in the first data center and a second consumer process executing on a second other host in the first data center, and wherein sending the task to another host in the first data center further comprises sending the task to either the first other host or the second other host based on a load-balancing decision.

3. The method of claim 1, wherein the message is an SMS message.

4. A system comprising:

multiple hosts operating in multiple data centers; and a logical queue distributed across the multiple hosts, wherein the system is configured to perform operations comprising:

producing, by a producer process executing on a host operating in a first data center, a task for forwarding a message in a mobile communication network;

determining whether there is a consumer process executing on the host operating in the first data center;

storing the task in the portion of the logical queue that is distributed to the host operating in the first data center when it is determined that there is a consumer process executing on the host operating in the first data center;

determining whether there is a consumer process executing on another host operating in the first data center when it is determined that there is no consumer process executing on the host operating in the first data center;

sending the task to another host operating in the first data center and storing the task in the portion of the logical queue that is distributed to the other host when it is determined that there is a consumer process executing on the other host;

determining whether there is a consumer process executing on a host operating in a second data center when it is determined that there is no consumer process executing on another host operating in the first data center;

sending the task to a host operating in the second data center and storing the task in the portion of the logical queue that is distributed to the host operating in the second data center when it is determined that there is a consumer process executing on the host operating in the second data center.

5. The system of claim 4, wherein determining whether there is a consumer process executing on another host operating in the first data center further comprises determining that there is a first consumer process executing on a first other host in the first data center and a second consumer process executing on a second other host in the first data center, and wherein sending the task to another host in the first data center further comprises sending the task to either the first other host or the second other host based on a load-balancing decision.

6. The system of claim 4, wherein the message is an SMS message.

\* \* \* \* \*